H. PARKER.
STARTING DEVICE FOR AUTOMOBILES.
APPLICATION FILED APR. 22, 1912.
1,066,649.
Patented July 8, 1913.
2 SHEETS—SHEET 1.
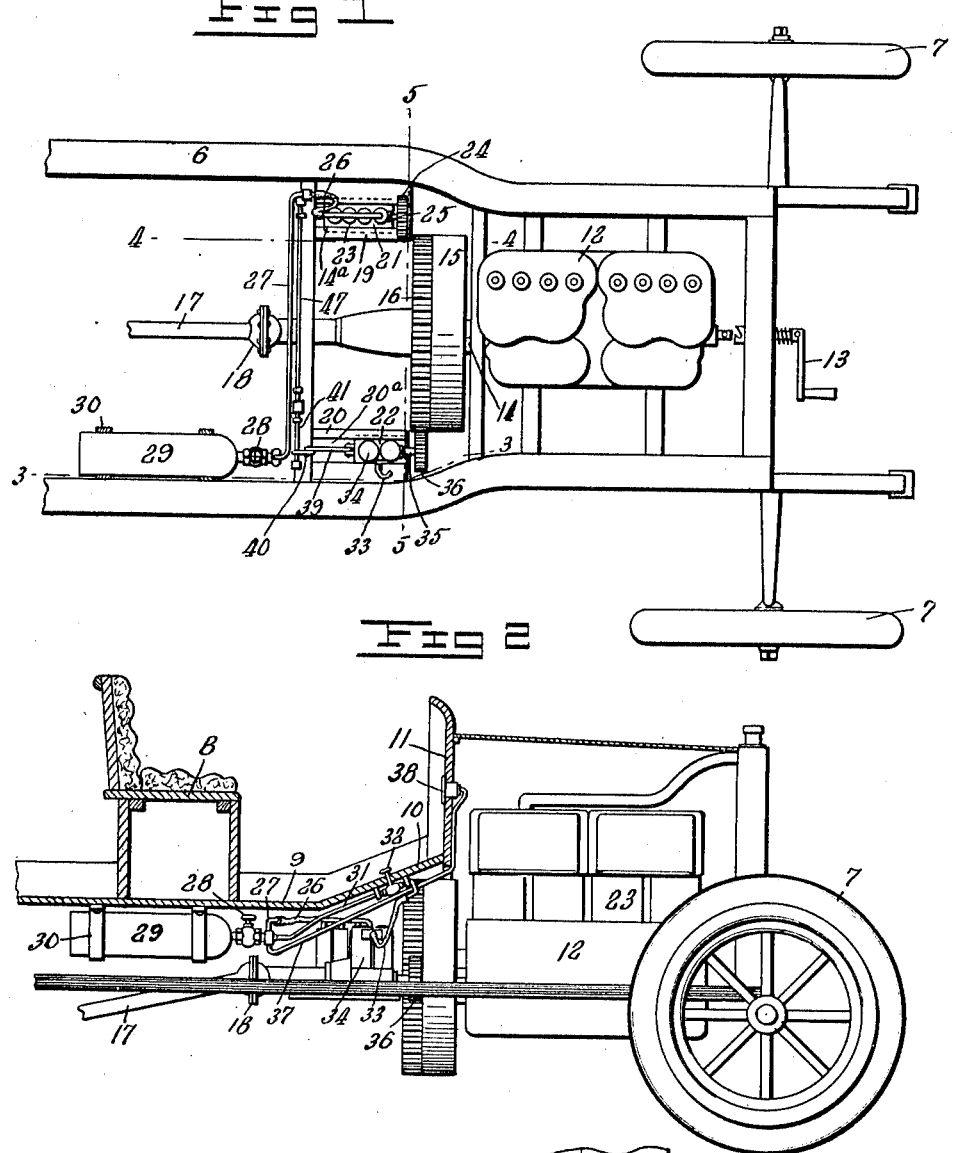
Witnesses
H. C. Robinett
Walton Harrison
Inventor
Harry Parker
By
Attorney H. PARKER.
STARTING DEVICE FOR AUTOMOBILES.
APPLICATION FILED APR. 22, 1912.
1,066,649.
Patented July 8, 1913.
2 SHEETS—SHEET 2.
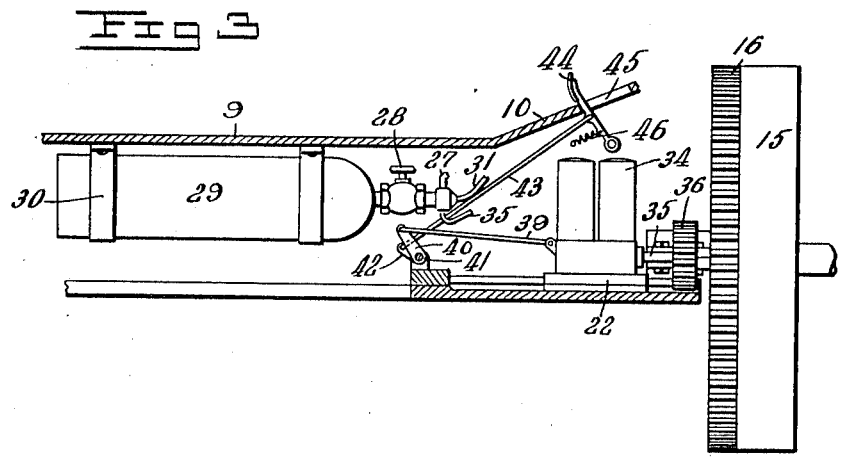
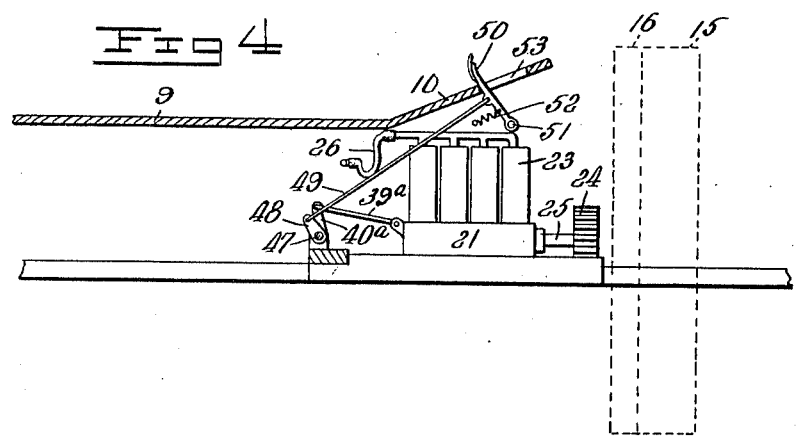
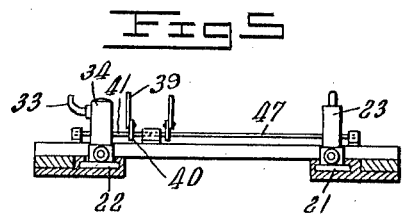
Witnesses
H. G. Robinett
Walton Harrison
Inventor
Harry Parker
By (attorney signature)
Attorney

UNITED STATES PATENT OFFICE.

HARRY PARKER, OF CULLMAN, ALABAMA.

STARTING DEVICE FOR AUTOMOBILES.

1,066,649.   Specification of Letters Patent.   Patented July 8, 1913.

Application filed April 22, 1912. Serial No. 692,451.

*To all whom it may concern:*

Be it known that I, HARRY PARKER, a citizen of the United States, residing at Cullman, in the county of Cullman and State of Alabama, have invented new and useful Improvements in Starting Devices for Automobiles, of which the following is a specification.

My invention relates to starting devices for automobiles of the kind operated by internal combustion engines, my more particular purpose being to provide a type of starting device so arranged as to be readily built into the frame of the automobile, and operated with ease by the chauffeur thereof without the necessity for leaving his seat.

My invention further relates to the provision of suitable gearing to be carried by the automobile and specially adapted for connecting the starting device with the engine shaft of the automobile and for disconnecting the same therefrom.

More particularly stated I provide an automobile with a large gear wheel mounted upon the engine shaft and an air compressor and an air motor located upon opposite sides of said gear wheel, said air motor and air compressor being provided respectively with pinions to be brought into and out of engagement with said gear wheel, and I further provide means controllable by the chauffeur for conveniently shifting said air motor and said air compressor for the purpose of bringing the pinions carried thereby into and out of engagement with said gear wheel.

My invention further comprehends various details in the construction of starting devices and more particularly of starting devices adapted for use in connection with automobiles.

Reference is made to the accompanying drawings forming a part of this specification, and in which like letters indicate like parts.

Figure 1 is a fragmentary plan of an automobile provided with my improved starting device certain parts being removed for the sake of clearness. Fig. 2 is a substantially central section through Fig. 1 looking in the direction of the arrow. Fig. 3 is a fragmentary section on the line 3—3 of Fig. 1, looking in the direction of the arrow. Fig. 4 is a fragmentary vertical section on the line 4—4 of Fig. 1, looking in the direction of the arrow. Fig. 5 is a fragmentary cross-section on the line 5—5 of Fig. 1, looking in the direction of the arrow, and showing the relative positions of the air motor and air compressor. Fig. 6 is a detail showing the shape of certain gear teeth, said shape being advantageous for facilitating the connection and disconnection of the gear members.

The chassis is shown at 6, the front wheels at 7, and the chauffeur's seat at 8. The floor appears at 9 and is provided with an upturned portion 10 serving as a foot board. Extending upwardly from the front edge of the foot board is the dash board 11.

The internal combustion engine used for propelling the automobile is shown to be at 12 and in this instance is provided with a hand crank 13, which, however, is merely an auxiliary appliance and is not to be used under ordinary conditions. The engine shaft is shown at 14 and mounted rigidly upon it is a fly wheel 15 provided adjacent to one of its crowns with gear teeth 16. These gear teeth are provided with rounded ends 16$^a$ and together with the fly wheel 15 constitute a driving wheel. A coupled shaft 17 is by aid of a universal joint connected with the engine shaft in the usual manner. The casing for the universal joint is shown at 18.

Disposed upon opposite sides of the chassis are stationary frames 19, 20, provided respectively with slide ways 19$^a$, 20$^a$, and mounted in these slide ways are slides 21, 22. An air compressor 23 is mounted upon the slide 21 and is movable bodily therewith in the general direction of the length of the automobile. The air compressor 23 is provided with a gear pinion 24 and with a revoluble shaft 25 supporting this pinion, by aid whereof the air compressor is actuated when said pinion 24 is turned. The pinion 24 is provided with teeth having rounded ends and adapted to mesh with the teeth 16. Connected with the air compressor 23 is a flexible tube 26 which leads to a pipe 27, the latter being provided with a hand valve 28, and in communication with an air tank 29. This air tank is supported by aid of straps 30. Connected also with the air tank 29 is a pipe 31 which leads to a foot valve 32, the latter extending upwardly through the foot-board 10 and into convenient reach of the operator. The valve 32 is connected by a flexible tube 33 with an air motor 34. This air motor is provided with a revoluble shaft 35 which carries a gear pinion 36 similar to the gear pinion 24 above described and similarly adapted to mesh with the teeth 16. A pipe 37 communicating with the air tank 29 extends upwardly and forwardly therefrom, and is connected with an air gage 38 carried by the dash board 11. Connected with the slide 22 is a link 39 which is pivoted to a crank 40, the latter being mounted rigidly upon a rock shaft 41, this rock shaft being suitably journaled upon the frame work. The shaft 41 is provided with a crank 42, and a link 43 extends from the crank 42 to a foot-lever 44. This foot-lever is pivotally mounted upon the frame work and extends upwardly through a slot 45 in the foot-board 10 so as to be in convenient reach of the chauffeur's foot. A spring 46 is connected with the foot-lever 44 and being under tension tends to normally hold the foot-lever in the position indicated in Fig. 3. Another rock shaft 47 is disposed horizontally and is suitably journaled. This rock shaft is provided with a crank 40$^a$, and a link 39$^a$ extends from this crank to the slide 21 as will be understood from Fig. 4. Another crank 48 is mounted rigidly upon the shaft 47. A link 49 extends from the crank 48 to a foot-lever 50. This foot-lever is similar to the foot-lever 44 above described and extends through a slot 53 in the foot-board. A spring 52 connected with the foot-lever 50 tends to keep it retracted during its normal position as indicated in Fig. 4. The foot-lever 50 is mounted upon a pivot pin 51.

The operation of my device is as follows: When the automobile is used for the first time or is used when from any cause the air tank 29 happens to be empty, it is cranked by aid of the hand controlled starting device 13. The engine being started the operator places his foot against the foot-lever 50 and by pressing the latter causes the rock shaft 47 to rock in a clockwise direction according to Fig. 4, so as to bring the gear pinion 24 into mesh with the teeth 16. This being done the running of the engine causes the air compressor to be operated so that air is forced into the air tank 29. The air tank being filled with air under a suitable degree of pressure as indicated by the air gage 38, the operator withdraws his foot from the foot-lever 50. This causes the spring 52 to throw the lever back into its normal position. This movement causes the shaft 47 to rock and as a consequence the slide 21 carrying the air compressor 23 moves toward the rear end of the chassis. The gear pinion 24 is thus disengaged from the teeth 16. When the automobile is to be again started, the chauffeur slowly opens the foot valve 32, thus directing a supply of air through the tank 29 into the air motor 34.

This starts the air motor into action and causes the pinion 36 to turn. At the same time the chauffeur places his foot against the foot-lever 44 and presses the same forward. This moves the slide 22 carrying the air motor and causes the pinion 36 to mesh with the teeth 16. These teeth and the teeth of the pinion being rounded intermeshing is very easily accomplished. The intermeshing is further facilitated by the fact that the pinion is in motion, and by changing its position relatively to the teeth 16 is quickly and easily brought into proper mesh therewith. The rotation of the pinion 36 causes the rotation of the fly wheel 15 in the direction in which it travels when driven by the engine, and the engine is thus, of course, easily started into action. This being accomplished the chauffeur closes the valve 32 and withdraws his foot from the foot-lever 44. The slide 22 is thus moved back into its normal position and the pinion 36 is withdrawn from engagement with the teeth 16.

As may be seen from the foregoing description the starting device is comparatively simple and efficient. All parts of it are so arranged as to be readily accessible to the operator, and the air compressor and the air motor are entirely independent of each other.

I do not limit myself to the precise construction shown, as variations may be made therefrom without departing from the spirit of my invention.

What I claim is:—

1. The combination with a chassis and an engine carried thereby, and having a revoluble shaft, of a revoluble member carried by said shaft, a pair of slides disposed adjacent to said revoluble member and movable relatively to said chassis, an air compressor mounted upon one of said slides and provided with a revoluble member for engaging said first-mentioned revoluble member, an air motor mounted upon the other of said slides and likewise provided with a revoluble member for engaging said first-mentioned revoluble member, an air tank connected with said air compressor and also with said air motor, and means controllable at the will of the operator for moving said slides independently of each other in relation to said chassis.

2. In a starting device for internal combustion engines the combination with a frame adapted to support an internal combustion engine, of a pair of brackets arranged at the opposite sides of the frame, a slide for each bracket, an air motor mounted on one of said slides, an air compressor mounted upon the opposite one of said slides, a gear mounted upon the fly-wheel of the internal combustion engine, pinions carried by said air motor and said air compressor, and means for independently moving said slides whereby to independently move said motor and said compressor toward the internal combustion engine to mesh said pinions independently with said gear.

3. In a starting device the combination with a frame and an internal combustion engine mounted on the frame, of a pair of slides mounted upon the frame at the opposite sides of the engine, a sectional shaft extending transversely across the frame, links connecting said slides independently to the sections of the shaft, levers upon the frame having connection with the shaft sections whereby to independently turn the same and thereby operate the slides toward and from the fly-wheel of said engine, a gear upon the fly-wheel of said engine, an air motor on one slide, a pinion on the air motor, an air compressor on the opposite slide, a second pinion on said air compressor, an air tank communicating with said motor and said compressor, and a valve associated with said tank adapted to control the flow of air to said air motor, said levers being adapted to move said slides whereby to independently intermesh said pinions with said gear.

4. A starting device for automobiles having internal combustion engines comprising a pair of slides mounted in the opposite sides of the frame of the automobile, an air motor on one slide, an air compressor on the opposite slide, interconnecting means disposed between the engine, the air motor and the compressor, a sectional shaft extending transversely across the automobile, pedals independently connected to the sections of the shaft, links between said shaft sections and said slides whereby to independently move said air motor and said air compressor into engagement with said engine, and an air tank communicating with said motor and said compressor.

5. A starting device for engines comprising a motor, a compressor, independent coupling means arranged between the motor, the compressor and the engine, an air tank communicating with said motor and said compressor, a valve associated with said motor whereby to admit air from the tank to the motor, a sectional shaft having connection with said motor and said compressor, and separate levers having connection with the sections of said shaft whereby to independently bring said motor and said compressor into operative engagement with the engine.

In testimony whereof I have hereunto set my hand in presence of two subscribing witnesses.

HARRY PARKER.

Witnesses:
 JOSEPH SPITZNAGEL,
 M. L. ROBERTSON.

---

Copies of this patent may be obtained for five cents each, by addressing the "Commissioner of Patents, Washington, D. C."